April 28, 1953    J. G. WRIGHT ET AL    2,636,168
FASTENER FORMING AND INSERTING MACHINE
Original Filed Jan. 18, 1947    7 Sheets-Sheet 1

JOHN G. WRIGHT
CHARLES D. TONEY
CHARLES A. WATKINS
EUGENE SUDAN    INVENTORS
WILLIAM A. MAXWELL

BY Warley L. Parrott
ATTORNEY

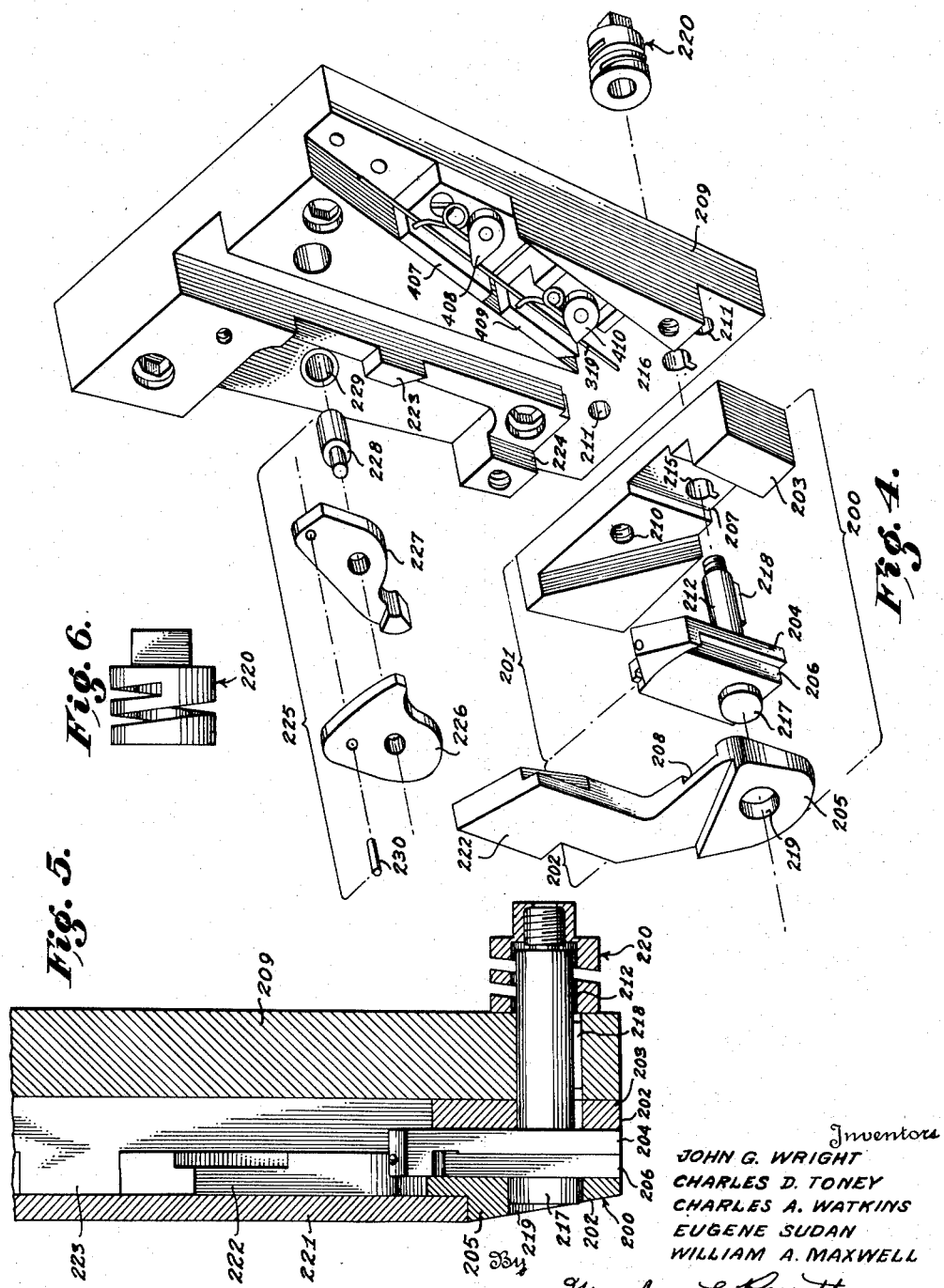

April 28, 1953   J. G. WRIGHT ET AL   2,636,168
FASTENER FORMING AND INSERTING MACHINE
Original Filed Jan. 18, 1947   7 Sheets-Sheet 4
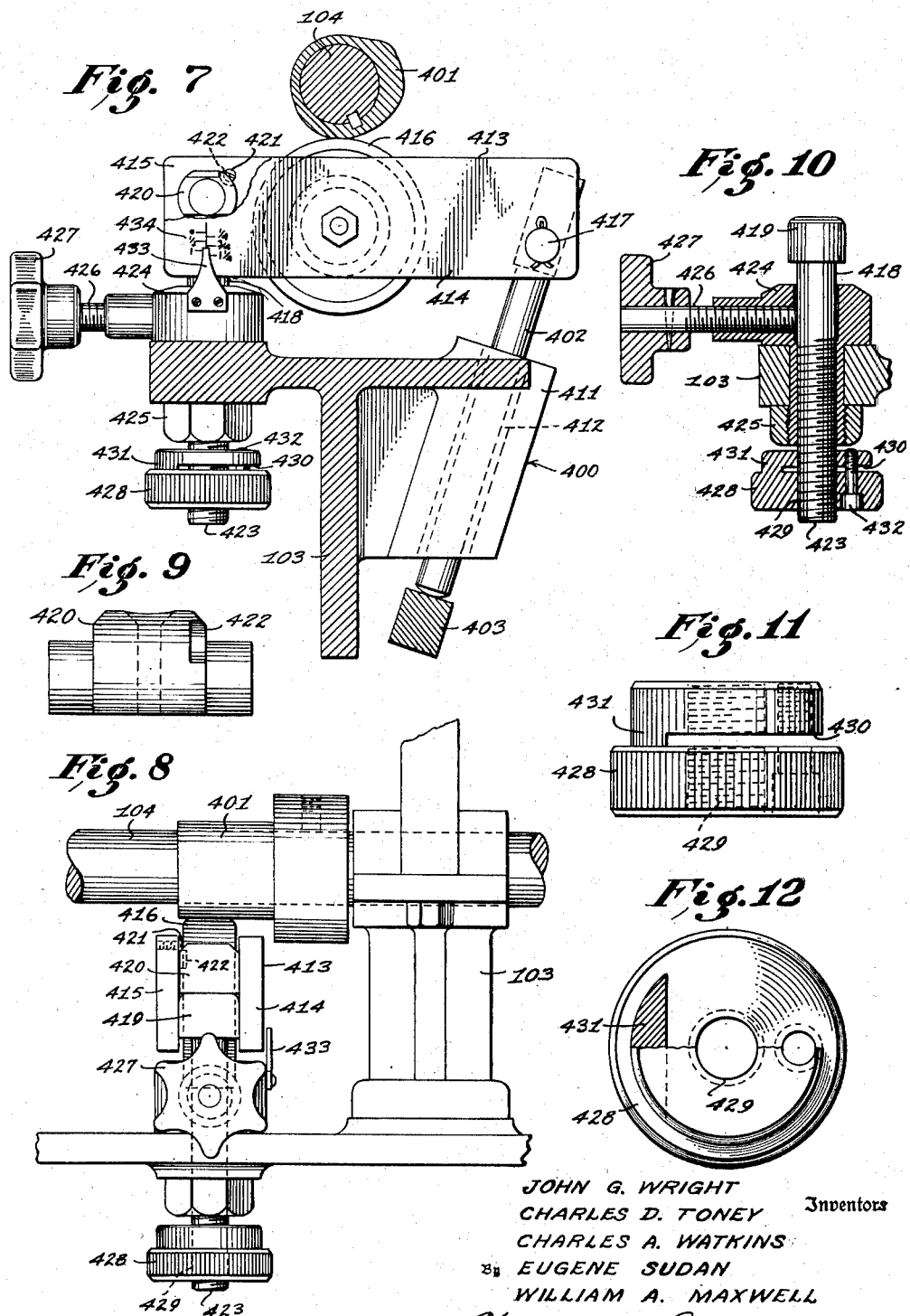
JOHN G. WRIGHT
CHARLES D. TONEY   Inventors
CHARLES A. WATKINS
By EUGENE SUDAN
WILLIAM A. MAXWELL
Warley L. Parrott   Attorney

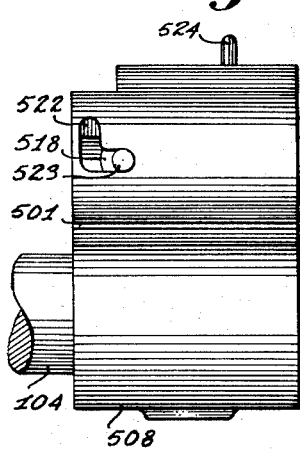
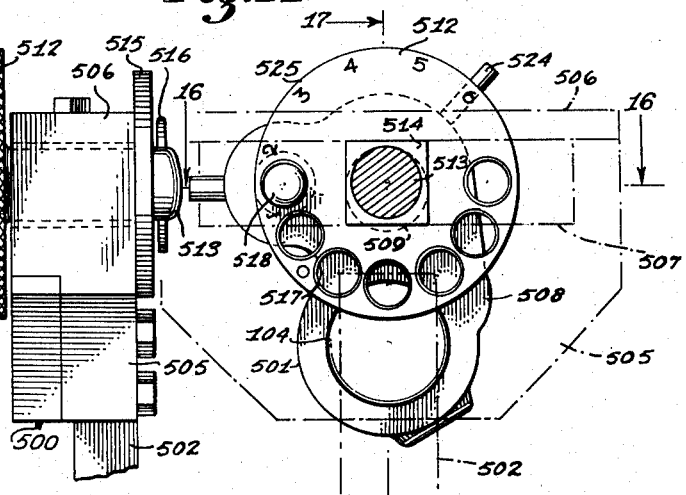
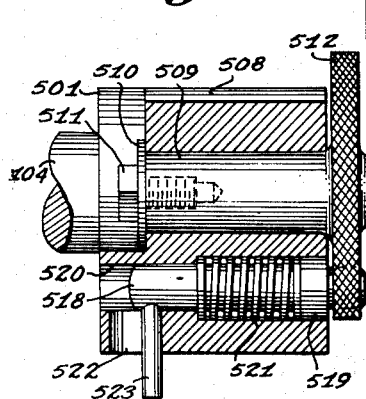
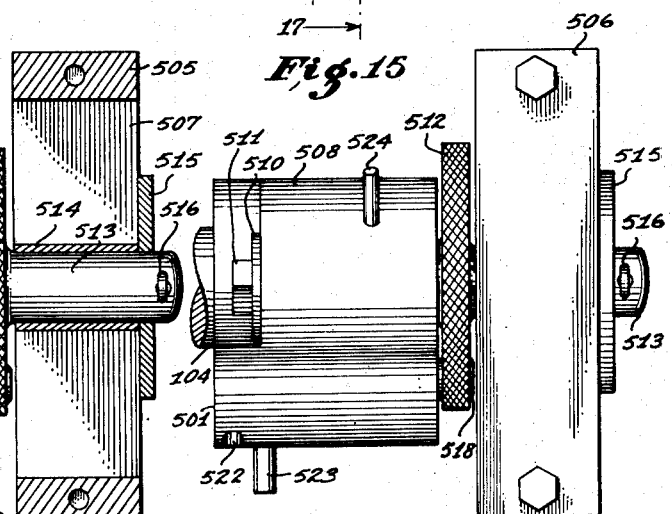
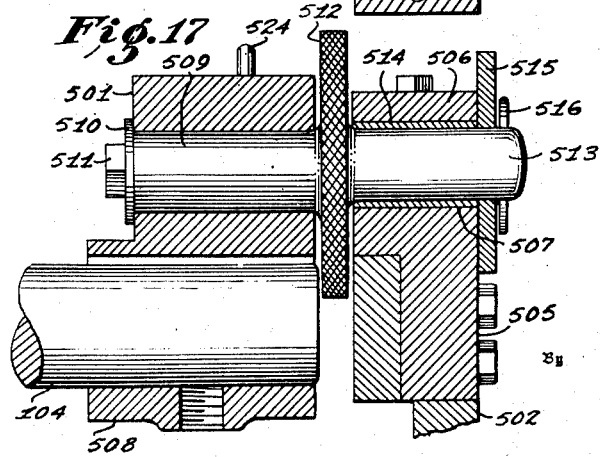

April 28, 1953 J. G. WRIGHT ET AL 2,636,168
FASTENER FORMING AND INSERTING MACHINE
Original Filed Jan. 18, 1947 7 Sheets-Sheet 7
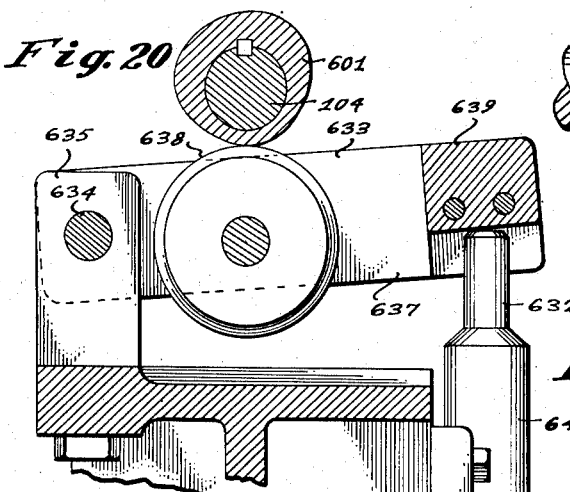
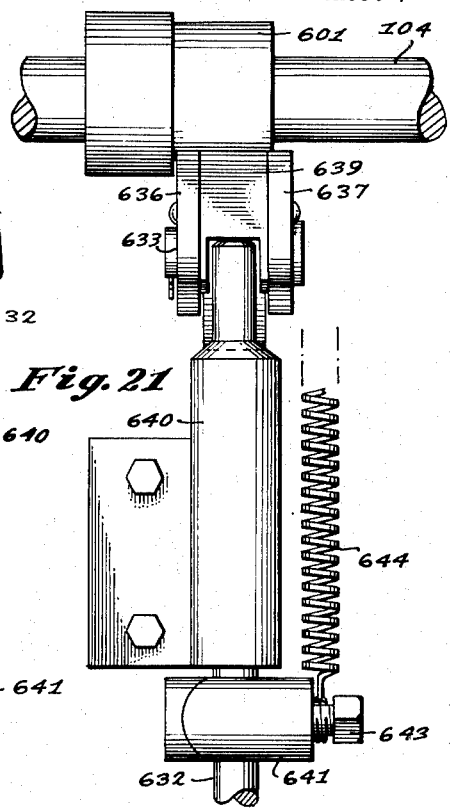
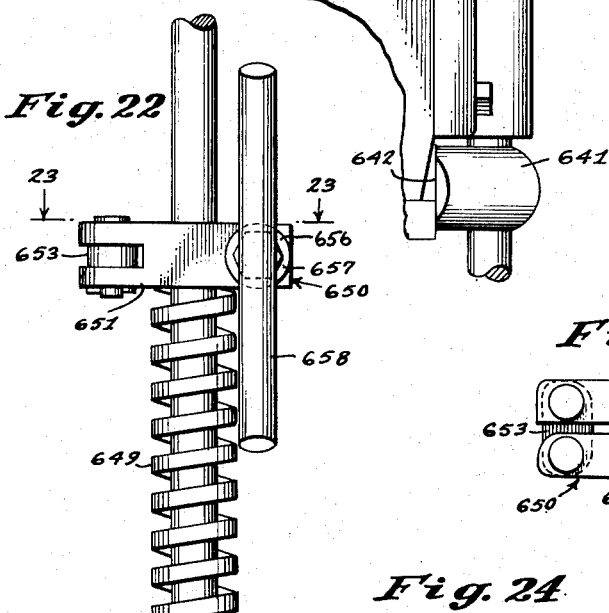
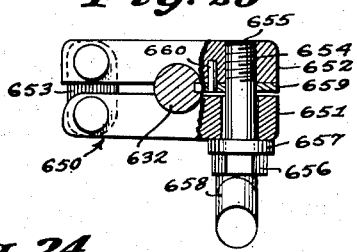
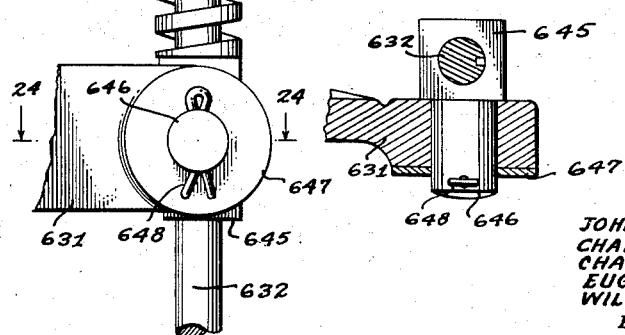
JOHN G. WRIGHT
CHARLES D. TONEY
CHARLES A. WATKINS
EUGENE SUDAN
WILLIAM A. MAXWELL
INVENTORS
BY Warley L. Parrott
ATTORNEY Patented Apr. 28, 1953

2,636,168

UNITED STATES PATENT OFFICE 2,636,168

FASTENER FORMING AND INSERTING MACHINE

John G. Wright, Charles D. Toney, Charles A. Watkins, and Eugene Sudan, Atlanta, and William A. Maxwell, Duluth, Ga., assignors to The Auto-Soler Company, a corporation of Georgia Original application January 18, 1947, Serial No. 772,806. Divided and this application December 13, 1950, Serial No. 207,887

4 Claims. (Cl. 1—29)

This invention relates to fastener forming and inserting machines, and more especially to a nailing machine which is adapted particularly for woodworking operations, and by which fasteners are formed from a continuous length of wire or the like and inserted in material to be secured. This is a division of our copending application Serial No. 722,806, filed January 18, 1947, and issued as U. S. Letters Patent No. 2,571,984, on October 16, 1951.

In the copending application of Wright et al., Ser. No. 595,776, filed May 25, 1945, and issued as U. S. Letters Patent No. 2,250,521, on August 29, 1950, a machine of the same general type adapted for soling shoes is disclosed. The present invention represents an improvement over the machine disclosed in the above application and incorporates modified and novel features adapting the present machine for heavy duty service in woodmaking operations as described more in detail below.

In the drawing:

Fig. 4 is a blown-apart assembly view illustrating the arrangement of the fastener forming knife assembly in the operating head;

Fig. 5 is a fragmentary vertical section showing the fastener forming knife assembly in assembled position;

Fig. 6 is a detail of the fastening means used in assembling the fastener forming knife assembly;

Fig. 7 is a detail oriented substantially on the line 7—7 in Fig. 2 showing the arrangement for wire feed adjustment to control the length of fasteners formed;

Fig. 8 is a corresponding detail in side elevation;

Fig. 9 is a detail of the pivot lug associated with the crossarm shown in Figs. 7 and 8;

Fig. 10 is a sectional detail of the adjusting stud shown in Figs. 7 and 8;

Fig. 11 is a side view of the form of adjusting handle associated with the adjusting stud;

Fig. 12 is a corresponding plan view partly in section;

Fig. 13 is a fragmentary detail in side elevation of the arrangement for adjusting the driving depth of the fastener inserting plunger;

Fig. 14 is a corresponding front elevation with some of the operating elements indicated in dotted lines;

Fig. 15 is a corresponding plan view;

Fig. 16 is a sectional detail taken on the line 16—16 in Fig. 14;

Fig. 17 is a sectional detail taken on the line 17—17 in Fig. 14;

Fig. 20 is a detail oriented substantially on the line 20—20 in Fig. 2 showing the arrangement for actuating the work support mechanism during fastener forming operations;

Fig. 21 is a corresponding detail in side elevation;

Fig. 22 is a fragmentary detail illustrating the manner in which the actuating elements shown in Fig. 20 are associated with the work support;

Fig. 23 is a sectional detail taken substantially on the line 23—23 of Fig. 22; and, Fig. 24 is a sectional detail taken substantially on the line 24—24 of Fig. 22.

As mentioned above, the present invention is directed particularly to a nailing machine adapted for forming a plurality of fasteners from a continuous length of wire and inserting the fasteners formed in material to be secured. While certain features of the invention may be used in fastener inserting machines generally, and others are of general application otherwise, the invention is shown in the accompanying drawing for purposes of illustration as embodied in a machine of the above type.

Figure 1:
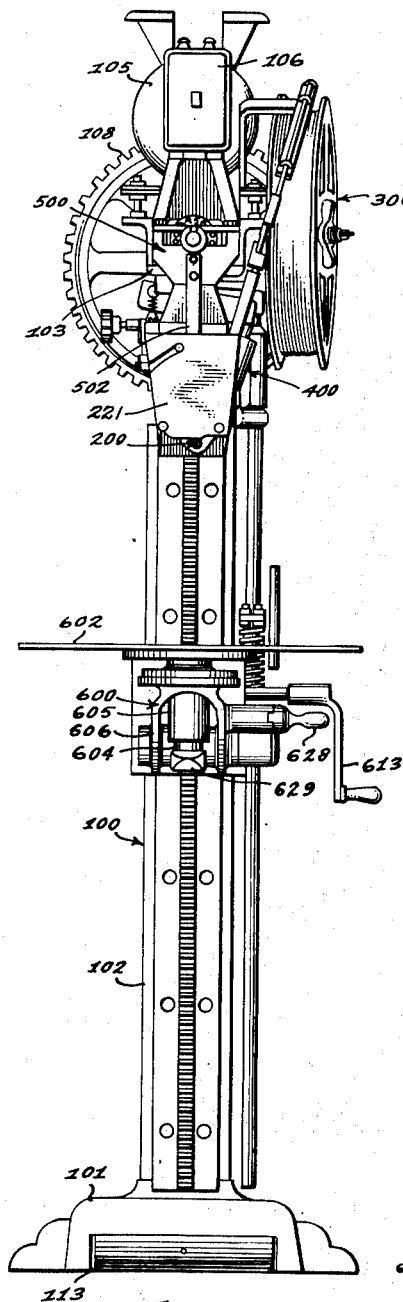
Fig. 1 is a front elevation of a fastener forming and inserting machine constructed in accordance with the present invention.
Figure 2:
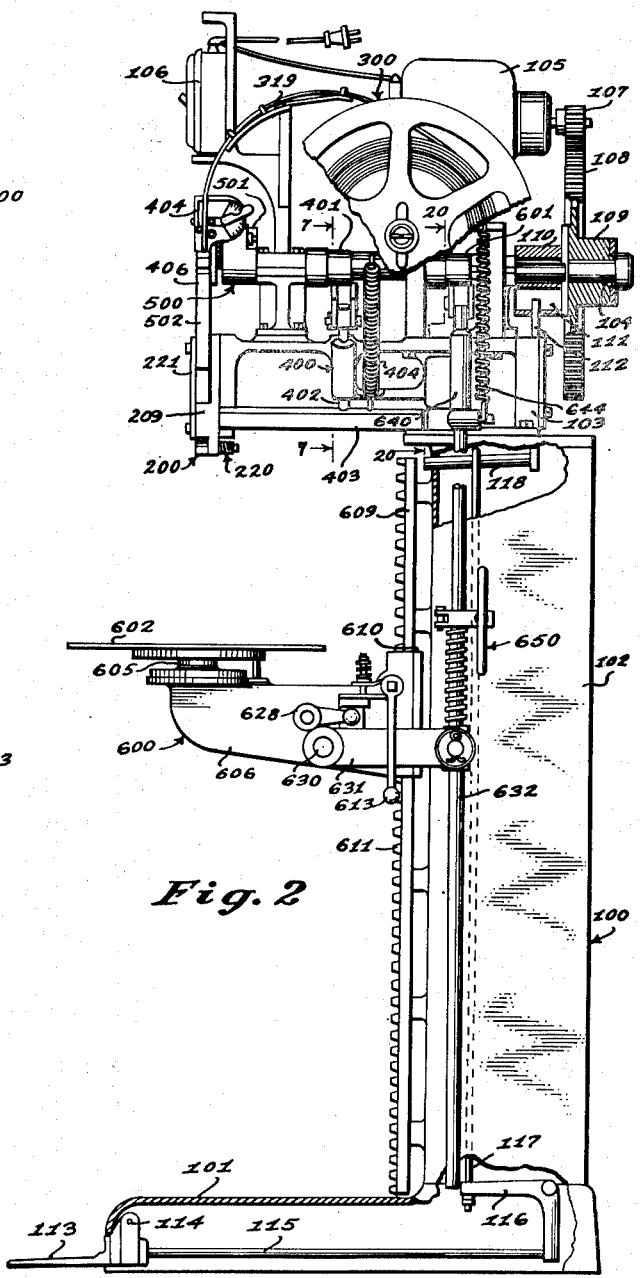
Fig. 2 is a corresponding side elevation partly cut away and partly in section.

Referring first to Figs. 1 and 2 of the drawing, the nailing machine shown comprises generally a suitable frame structure 100 supporting an operating mechanism incorporating means for cyclic actuation of fastener forming and inserting operations in association with a fastener forming knife assembly indicated generally at 200, means for mounting a supply of wire on the machine shown at 300, means 400 for feeding wire from this supply for fastener forming operations, a fastener inserting plunger mechanism 500, and a work supporting mechanism 600.

The frame structure 100 is made up of a base portion 101 adapted to support the machine on a floor or similar surface, a column portion 102 extending vertically from the base portion 101, and an upper frame section 103 mounted at the upper extending end of the column portion 102. The upper frame section 103 is arranged to support an operating shaft 104 in relation to a motor drive unit 105 controlled from a suitable switch box 106. Operating shaft 104 is connected with motor 105 through armature shaft pinion 107 and drive gear 108. The drive gear 108, which is mounted to rotate freely on shaft 104, is formed with a hub portion arranged as a driving clutch member 109. A driven clutch member 110 is fixed on shaft 104 in opposed spaced relation to the driving clutch member 109, and houses a spring pressed clutch pin 111 which is normally held in disengaged position by a clutch bar 112 positioned in engagement with clutch pin 111 by a spring (not shown).

The above described clutch mechanism is operated from a suitable foot pedal 113 mounted in the base portion 101 of frame structure 100. The pedal 113 is pivoted in base portion 101, as at 114, so that when it is depressed a connecting rod 115 is shifted to pivot a bell crank 116 and similarly shift a second connecting rod 117. This second connecting rod 117 is arranged in the column portion 102 of frame structure 100 to extend between bell crank 116 and a lever bar 118 fulcrumed at one end in the column portion 102 and assembled with clutch bar 112 at its other end.

This linkage is accordingly such that depression of pedal 113 causes connecting rod 117 to shift downwardly in column portion 102 and pivot the fulcrumed lever bar 118 to trip clutch bar 112 and thus release clutch pin 111 to engage the driving clutch member 109 so that operating shaft 104 is rotated with drive gear 108 by motor 105. Upon a complete revolution of operating shaft 104, the crank pin 111 is withdrawn from driving clutch member 109 by clutch bar 112 in the usual manner, unless the pedal 113 remains depressed to initiate a succeeding cycle of operation. By this arrangement controlled operation of shaft member 104 is effected for the cyclic actuation of fastener forming and fastener inserting operations as described more in detail below.

The construction of the fastener forming knife assembly 200, referred to above, is illustrated in Figs. 3 to 6, inclusive, of the drawing. Generally described, this assembly comprises a stationary blade member 201 and a matched movable blade member 202 adapted for assembly with the stationary blade member 201 for movement between fastener forming and fastener inserting positions.

The various elements of knife assembly 200 are shown in Fig. 4 in exploded relation indicating their operating association in assembled relation. The stationary blade member 201 is composed of a holder 203 and a blade insert 204. Likewise, the movable blade member 202 includes a holder 205 and a blade insert 206. Holder 203 of the stationary blade member is recessed as at 207 to receive the blade insert 204, and holder 205 of the movable blade member as shown at 208 to receive blade insert 206.

The knife assembly 200 is assembled for operation in relation to an operating head 209 mounted on the upper frame section 103 (see Fig. 2). The holder 203 of the stationary blade member 201 is secured directly on operating head 209, tapped holes (one of which is shown in Fig. 4 at 210) being provided for this purpose to receive fastening screws (not shown) extended through openings as at 211 in the operating head 209.

Assembly of the movable blade member 202 with stationary blade member 201 for movement between fastener forming and fastener inserting positions is effected by means of a stud member 212. Aligned apertures in movable blade insert 206 and stationary blade insert 204, and at 215 in holder 203 of stationary blade member 201, and 216 in operating head 209, are provided to receive stud member 212 and define a pivot axis for movable blade member 202 with respect to stationary blade member 201.

Stud member 212 is formed with a head portion 217 arranged to seat on movable blade insert 206 as shown, and is fitted with a key 218 which is pressed in place so that the stationary and movable blade insert 204 and 206 are retained on stud member 212 for mounting and removal as a unit. Holder 205 of the movable blade member 202 is formed with a further aperture 219 to provide clearance for the head portion 217 of stud member 212 in assembled position. When knife assembly 200 is mounted, the key 218 on stud member 212 is positioned in operating head 209 (see Fig. 5), and stud member 212 is secured in place by a fastening means 220 which is described more in detail below. The holder 205 of movable blade member 202 is pivotably positioned by the head portion 217 of stud member 212, and is retained against lateral movement by a face plate 221 mounted on operating head 209 (see Figs. 1, 2 and 5).

This method of assembly provides a secure mounting for stationary blade member 201 on operating head 209 while allowing free movement of movable blade member 202 on stud member 212 between fastener forming and fastener inserting positions. This movement of movable blade member 202 is actuated through a cam arm portion 222 of holder 205 which is disposed for shifting between a fastener forming position stop 223 and a fastener inserting position stop 224 on operating head 209.

Shifting of movable blade member 202 between stops 223 and 224 is effected by operation of the fastener inserting plunger mechanism 500 and a cam follower assembly 225 pivoted on operating head 209. The cam follower assembly 225, as best shown in Fig. 4, comprises an upper lever segment 226 and a lower lever segment 227 assembled on a pivot pin 228 which is carried in a bushed opening 229 in operating head 209. The upper and lower lever segments 226 and 227 are doweled in proper assembled relation by a shear pin 230, which is provided to allow the operating mechanism to give at this point in the event of jamming of knife assembly 200 and thus avoid damage to more important and expensive parts of the mechanism. The upper lever segment 226 is formed to follow the action of the plunger mechanism 500, and lower lever segment 227 to follow the cam arm portion 222 on holder 205 of movable blade member 202, and thus relate these elements for operation of the knife assembly 200 in accordance with the cyclic actuation of fastener forming and fastener inserting operations as described more in detail below.

The means, indicated generally at 400 in Figs. 1, 2 and 7, for feeding the wire 319 for fastener forming operations comprises a cam element 401 mounted for rotation with operating shaft 104 and arranged to displace a plunger member 402 and thus actuate a feeding stroke on each revolution of shaft 104. The plunger member 402 is associated with a lever bar 403 which transmits the feeding stroke to means provided in operating head 209 for gripping wire 319 and advancing it to knife assembly 200 as will be described below.

The lever bar 403 is pivoted on upper frame structure 103 at one end, and is associated with plunger member 402 about midway of its length. Displacement of plunger member 402 by cam element 401 depresses lever bar 403 about its pivot on frame structure 103 so that its other end which extends to operating head 209 shifts to operate the above mentioned means for advancing the wire 319. The lever bar 403 is conditioned for return to its original position after a feeding stroke by a spring assembly 404 mounted on upper frame structure 103.

Figure 3:
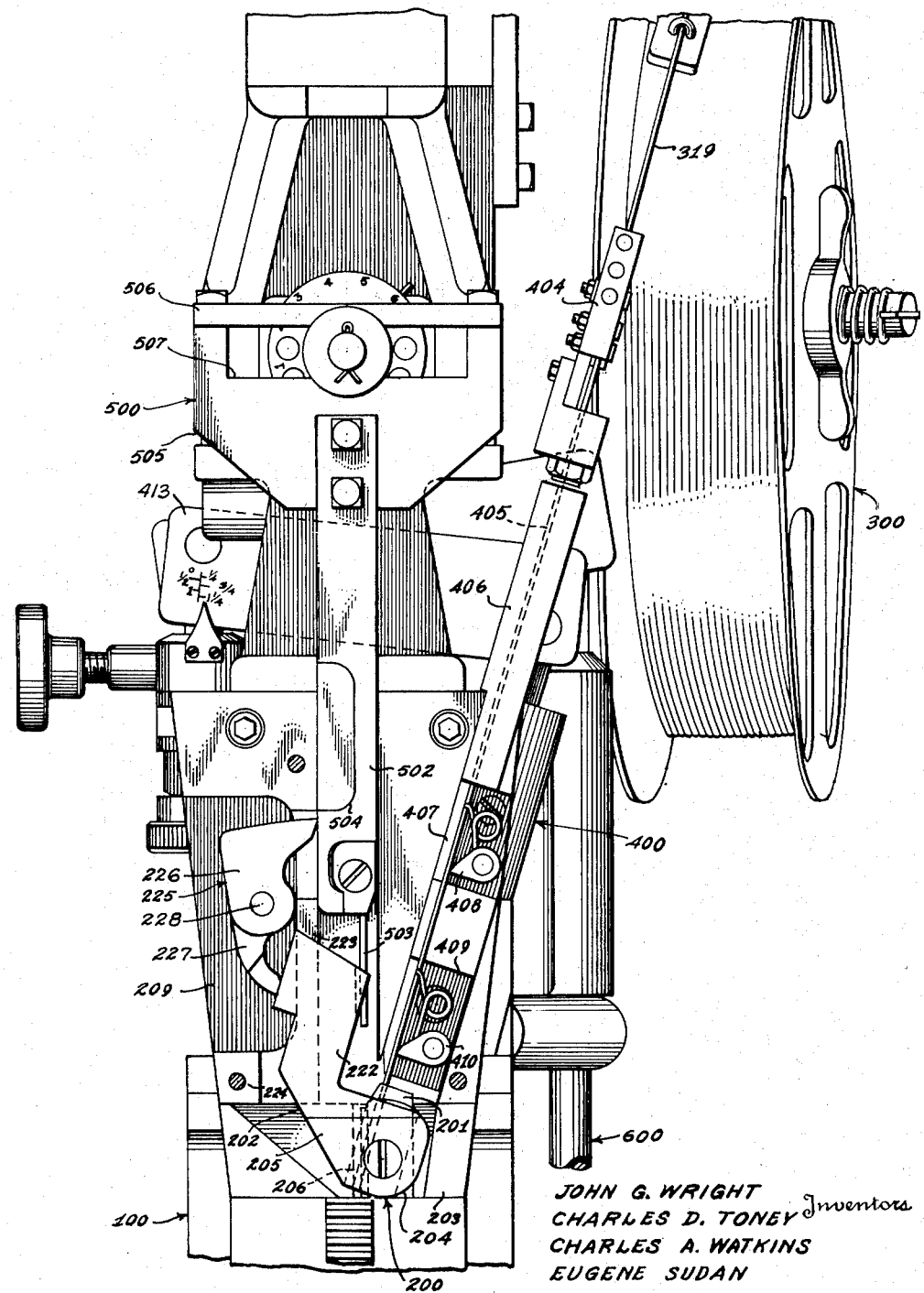
Fig. 3 is an enlarged detail of the operating head and related elements.

The means provided in operating head 209 for advancing the wire 319 is shown in Figs. 3 and 4. The wire 319 directed from the supply carried on mounting means 300 is introduced in operating head 209 through a passageway 405 formed for this purpose in a supporting arm 406 extending from operating head 209 to carry straightening rolls 404.

The wire 319 is delivered through the passageway 405 to a fixed block 407 mounted in operating head 209 which carries a spring pressed detent 408 engaging the wire 319 to prevent its withdrawal but allowing it to be advanced. Below the fixed block 407, a second block 409 is arranged which is similar in form and also carries a spring pressed detent 410. This second block 409, however, is movable and is actuated by the above described lever bar 403 to advance the wire 319 to knife assembly 200. The movable block 409 which is represented in Fig. 3 at a position it might assume upon completion of a feeding stroke and will be moved upwardly to a position adjacent the fixed block 407 for beginning a feeding stroke. In actual operation, the travel of movable block 409 between these two positions establishes the length of the fastener formed by knife assembly 200, and an adjusting mechanism is accordingly provided to vary the travel of movable block 409 in accordance with the length of fastener desired, as illustrated in Figs. 7 to 12, inclusive, of the drawing.

This adjusting mechanism operates by controlling the extent of displacement of plunger member 402 to control the feeding movement of movable block 409. An enlarged detail on the arrangement of plunger member 402 is shown in Fig. 7. A boss 411 is formed on frame structure 103 and is suitably bushed, as represented at 412, to mount plunger member 402 for reciprocation. Downward movement of plunger member 402, as mentioned above, results from displacement by cam element 401, which is transmitted to lever bar 403 on which it rests, and returning upward movement is effected by the spring assembly 404 associated with lever bar 403.

Displacement of plunger member 402 by cam element 401 is effected through a lever element 413 pivotally connected with the upper end of plunger member 402 and supported on frame structure 103 in relation to cam element 401. This lever element 413 is composed of two plates 414 and 415 between which a roller 416 is mounted to serve as a follower for cam element 401. These plates also extend on either side of the upper end of plunger member 402 to receive a pivot pin 417 connecting them with the plunger member 402. As lever element 413 is supported on frame structure 103, displacement of roller 416 by cam element 401 will be transferred through lever element 413 to effect a feeding stroke of plunger member 402. And it follows that if the support for lever element 413 is adjusted to vary the displacement of roller 416 by cam element 401, the feeding stroke of plunger member 402 will be correspondingly varied.

Means for making such an adjustment of the support for lever element 413 is provided by mounting a stud member 418 on frame structure 103 to support the lever element 413 as shown in Figs. 7, 8, and 10. This stud member 418 is formed with a head portion 419 to provide a positioning support for lever element 413. The two plates 414 and 415 of lever element 413 are assembled with a rocker pin 420 (compare Fig. 8) having a flat bottom surface adapted to ride the head portion 419 of stud member 418. A screw 421 is disposed in the rear plate 415 of lever element 413 to cooperate with a recess 422 formed in rocker pin 420 and limit its rocking motion, but otherwise rocker pin 420 is free to pivot in lever element 413 and slide on the head portion 419 of stud member 418 during displacement of lever element 413.

The shank 423 of stud member 418 is threaded, and this threaded shank is received by, and extends through, a bushing 424 assembled on frame structure 103 by a nut 425, so that stud member 418 may be adjusted in bushing 424 to vary the supported position of lever element 413 and roller 416 in relation to cam element 401. The bushing 424 also receives a set screw 426, fitted with a convenient manipulating handle 427, for securing the stud member 418 in bushing 424 in adjusted position.

To provide a manipulating handle for stud member 418, a collar element 428 is assembled on the extending end of shank portion 423, as shown best in Figs. 10, 11 and 12. This collar element 428 is formed with a threaded bore 429 adapted to engage the threaded shank 423 of stud member 418. The body of collar element 428 is divided transversely by a slot 430 except for a land portion 431 spaced from the threaded bore 429. Diametrically opposite the land portion 431, and also spaced from the bore 429, the divided portions of collar element 428 are fitted with a screw 432 so that the head of this screw 432 seats in one portion and its threads engage the other portion (see Fig. 10). Tightening of the screw 432 will accordingly flex the divided portions of collar element 428 about land portion 431 and thereby lock it on the shank 423 so as to serve as a handle for adjusting stud member 418 in bushing 424. As a guide for adjusting the supported position of lever element 413, as described above, a pointer 433 may be mounted on bushing 424 in relation to a scale 434 laid out on the front plate 414 of lever element 413 and graduated in terms of the fastener length resulting from the feeding stroke obtained by displacement of lever element 413 at the indicated supported position.

Following feeding of the wire 319 to knife assembly 200, as just described, the fastener forming and inserting operations are effected in relation to the actuation of the previously mentioned fastener inserting plunger mechanism 500. This mechanism is actuated by a crank mechanism 501 mounted for rotation with operating shaft 104, as indicated in Fig. 2, and comprises a plunger member 502 arranged for reciprocation in operating head 209. At its lower end this plunger member 502 carries a driver 503 which on each driving stroke penetrates the stationary blade insert 204 and movable blade insert 206 in fastener inserting position to drive the fasteners formed by knife assembly 200.

Plunger member 502 also serves to shift the knife assembly 200 from fastener forming to fastener inserting position by contacting the cam arm portion 222 on holder 205 of movable blade member 202 on each driving stroke. To allow shifting of follower assembly 225 as this occurs, plunger member 502 is recessed as shown at 504, and as the follower assembly will shift to extend into this recess 504 on each driving stroke of plunger member 502, it will contact the lower end of the recess 504 on the return stroke and as a result be shifted back to return the movable blade member 202 of knife assembly 200 from fastener inserting position to fastener forming position.

As mentioned above, the reciprocation of plunger member 502 is actuated by the crank mechanism 501 mounted on operating shaft 104, and plunger member 502 is assembled at its upper end with a cross head 505 which is slotted and fitted with a top plate 506 to define a transverse operating slot 507 for crank mechanism 501. Details of the arrangement of crank mechanism 501 are shown in Figs. 13 to 17 of the drawing.

This crank mechanism 501 comprises a body member 508 fixed on operating shaft 104 for rotation in accordance with the cyclic actuation of fastener forming and fastener inserting operations. A crank pin 509 is carried by body member 508 in spaced parallel relation with respect to shaft 104. Crank pin 509 is positioned in body member 508 by a washer 510 secured at one of its ends by a screw 511 to act as a retaining shoulder, and an enlarged circular flange portion 512 formed integrally with, or otherwise attached to, crank pin 509 about midway of its length. Beyond the flange portion 512, crank pin 509 extends from body member 508, as shown at 513, and is fitted with a slide block 514, held in place by a washer 515 and cotter pin 516 as shown, for operation in the transverse slot 507 provided in cross head 515. Rotation of body member 508 with operation shaft 104 is accordingly translated by this arrangement into reciprocation of the fastener inserting plunger member 502.

The operation of plunger member 502 to drive the fasteners formed by knife assembly 200 has been described above, and it will be noted that the length of the reciprocating stroke of plunger member 502 will determine the depth to which the fasteners are driven in work positioned in the machine. That is, a longer stroke would be required to countersink the fasteners than just to drive them flush, and different lengths of stroke would be required for different degrees of countersinking.

In order to render crank mechanism 501 adjustable so that a length of stroke corresponding to a desired driving depth may be selected, the extending end 513 of crank pin 509 is formed eccentrically so that by rotating crank pin 509 in body member 508 the throw of crank mechanism 501 may be varied. The above mentioned flange portion 512 of crank pin 509 is provided for making this adjustment, and adjusted positions of crank pin 509 are fixed by an annular series of apertures 517 formed in flange portion 512. Crank pin 509 is locked at a given adjusted position through engagement of the corresponding aperture 517 by a locking pin 518 mounted in body member 508.

The locking pin 518 is formed with a shoulder 519 and is received by a bore 520 which is counterbored to allow association of a spring 521 with locking pin 518 for disposition between the shoulder 519 and the bottom of the counterbore so as normally to urge pin 518 into locking engagement with one of the apertures 517 formed in flange portion 512. To provide for withdrawing locking pin 518 during adjustment of crank pin 509 for driving depth, an L-shaped slot 522 is formed in body member 508 and a pin 523 is fitted in locking pin 518 through this slot 522. Accordingly, by moving the pin 523 down the leg of the L-shaped slot 522 locking pin 518 may be withdrawn into the body member 508 against the force of spring 521, and by shifting pin 523 into the foot of L-shaped slot 522 the locking pin 518 may be retained in this position and thus allow free manipulation of flange portion 512 to adjust crank pin 509.

Adjustment of crank pin 509 may be gauged by the relation of an index peg 524, extending from body member 508, to index numerals 525 scribed adjacent the periphery of flange portion 512 to indicate the relative driving depths established by the series of apertures 517. Upon selection of the desired new adjustment for crank pin 509, pin 523 may be shifted from the foot of L-shaped slot 522 to release locking pin 518 for return to locking engagement with the corresponding aperture 517.

The fastener forming and inserting machinery of the present invention further comprises a work supporting mechanism 600 for positioning work in the machine. While a work supporting mechanism for a machine of this sort should allow work to be positioned readily in the machine, it must also be arranged to prevent shifting of the work during fastener inserting operations. Such shifting of the work is commonly avoided by providing means for moving the work support in work supporting direction during the fastener inserting operation so that it is gripped between the work support and the operating head of the machine as the fasteners are inserted. The work supporting mechanism 600 of the present invention is arranged for actuation in this manner from a second cam element 601 mounted to rotate with operating shaft 104. The action of this cam element 601 is transferred to the work supporting mechanism 600 through a unique connecting linkage adapted to the wide range of adjustment provided for the work support employed in the machine of the present invention, as described further below.

Figure 18:
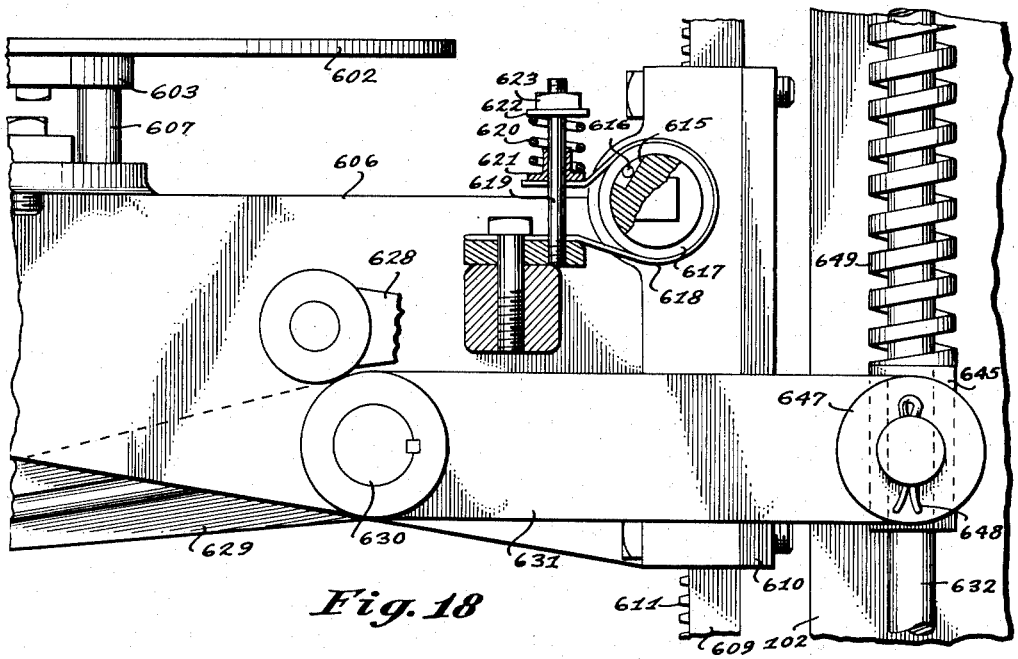
Fig. 18 is a fragmentary detail in side elevation illustrating the arrangement of the work supporting table.
Figure 19:
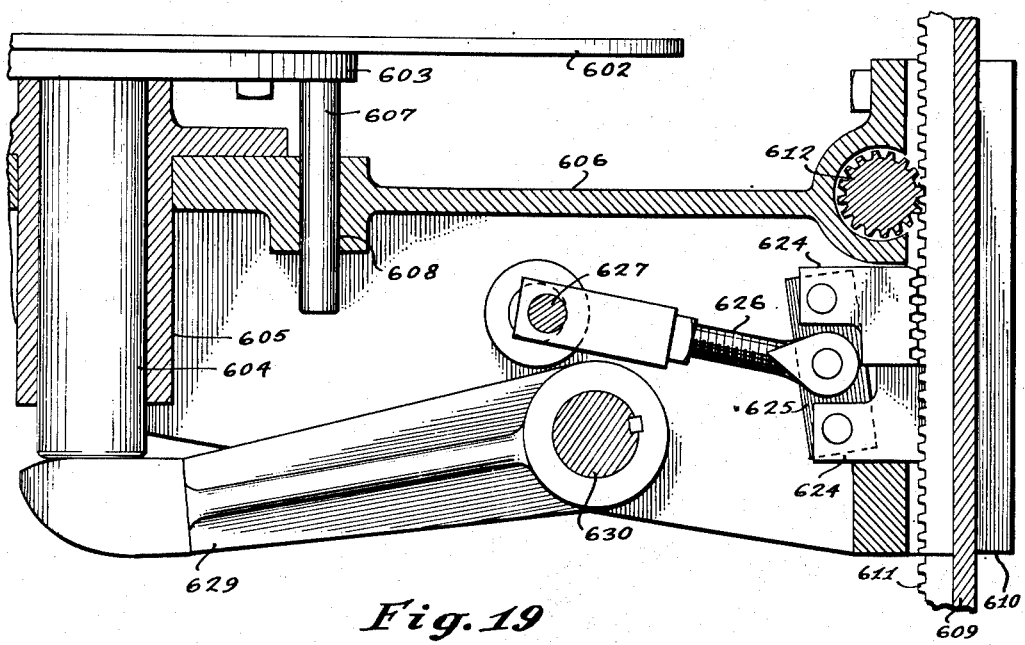
Fig. 19 is a substantially corresponding section showing further details of the work supporting table.

The work supporting mechanism illustrated generally at 600 in Figs. 1 and 2, is shown more in detail in Figs. 18 and 19. The work support proper comprises a table plate 602 secured centrally on a supporting member 603 fitted with a shank 604, which is slidingly received in a bushing 605 carried by an arm structure 606, and a radially spaced positioning dowel 607, which is slidingly received in an aperature 608 formed in arm structure 606 and serves to prevent rotative shifting of table plate 602 about shank 604.

The arm structure 606 is assembled on a vertical guide column 609 mounted on the column portion 102 of frame structure 100. This assembly is effected by slide blocks 610 secured on arm structure 606 to provide a sliding association with the vertical guide column 609 and thus allow vertical adjustment of the work supporting mechanism 600. An operating mechanism for obtaining vertical adjustment is provided by a rack 611 disposed on the vertical guide column 609 and a pinion 612 disposed for rotation on the arm structure 606 in engagement with rack 611. The pinion 612 is rotated by a crank member 613 to raise and lower the arm structure 606 on vertical guide column 609 for vertical adjustment of the work supporting mechanism 600.

In order to counteract the weight of work supporting mechanism 600 during downward adjustment, a cylindrical body member 614 is arranged for rotation with pinion 612 on arm structure 606. This cylindrical body member 614 is formed with a longitudinal surface slot 615 having a gradually inclined wall oriented in trailing position with respect to rotation of the cylindrical body 614 and pinion 612 corresponding to lowering of the arm structure 606. A roller member 616 is seated in the slot 615, and an annulus 617 is fitted over the cylindrical body 614 in sliding contact therewith and covering the slot 615 and roller member 616. A brake band 618 is disposed circumferentially over the annulus 617 from a stud member 619 carried on arm structure 606 and fitted with a spring 620 arranged between a sliding flange member 621 and washer 622 for clamping adjustment by a nut 623 to tighten brake band 618 suitably for braking rotation of the annulus 617.

As a result of this arrangement, during rotation of pinion 612, and consequently of the cylindrical body member 614, for lowering the work supporting mechanism 600, braking of annulus 617 by brake band 618 causes roller member 616 to wedge between the annulus 617 and cylindrical body 614 and thus counteract the weight of work support mechanism 600. When work support mechanism 600 is raised, however, the roller member 616 is shifted to the deep portion of slot 615 so that annulus 617 and cylindrical body 614 operate freely in sliding contact even though annulus 617 is braked.

Means for locking the arm structure 606 in adjusted position on vertical column guide 609 is provided by correlated rack segments 624 associated with the arm structure 606. These rack segments 624 are formed with staggered pitches in relation to the rack 611 to provide for engagement in closer correspondence with the adjusted position selected for arm structure 606, and are pivotably mounted for engagement with the rack 611 at the ends of a lever 625 which is in turn pivotably connected at its longitudinal center with arm 626 extending from an eccentric 627 mounted in arm structure 606 and operated by a crank member 628. Crank member 628 may accordingly be manipulated to withdraw the rack segments 624 from rack 611 to allow vertical adjustment of work supporting mechanism 600. When crank member 628 is returned to its locking position after the vertical adjustment is made, eccentric 627 will shift arm 262 so that both of the rack segments 624 on lever 625 will be moved into contact with rack 611. As the rack segments 624 are formed with staggered pitches, however, they can only be engaged selectively with rack 611. The pivoted arrangement of lever 625 allows such selective manipulation of the rack segments 624 so that the mating segment at the adjusted position of arm structure 606 will engage rack 611 to lock the work supporting mechanism in place.

The arm structure 606 also carries a lever structure for shifting the work support in work supporting direction during fastener inserting operations as previously mentioned. This lever structure comprises an arm 629 extending from a pivot shaft 630 journaled in arm structure 606.

The arm 629 extends to contact the bottom end of the shank 604 associated with the support 603 for table plate 602 so that it may be actuated to raise shank 604 vertically in the bushing 605 and thus shift table plate 602, and any work supported thereon, in work supporting direction. A second arm 631 extends rearwardly from the pivot shaft 630 for association with an operating rod 632 which is actuated from the previously mentioned cam element 601 mounted on operating shaft 104, as illustrated in Figs. 20 to 24 of the drawing.

Actuation of operating rod 632 by cam element 601 is effected through a lever element 633 generally similar to the previously described lever element 413 arranged for actuation of the wire feed mechanism 400 from cam element 401. The lever element 633 is pivotably supported as at 634 by a hangar block 635 mounted on upper frame structure 103, and comprises two plates 636 and 637 spaced to support a roller 638 in position to follow cam 601 and assembled with a block 639 riding the upper end of operating rod 632. Rotation of cam element 601 with operating shaft 104 will accordingly displace roller 638 to pivot lever element 633 on hangar 635 and depress operating rod 632.

The operating rod 632 is slidingly guided in a sleeve 640 mounted on frame structure 103 as shown in Figs. 20 and 21. Just below sleeve 640 a collar member 641, having a flat surface 642 in sliding contact with frame structure 103 to prevent turning, is secured on operating rod 632 by a set screw 643 from which a spring 644 is extended to a point of attachment (not shown) on frame structure 103 to return operating rod 632 after actuation by cam element 601.

Association of the operating rod 632 with the rearwardly extending arm 631 of the lever structure carried on supporting arm 606 is effected by a bushing block 645 fitted on operating rod 632 and formed with a pin portion 646 adapted for assembly as a pivot with arm 631 by a washer 647 and cotter pin 648 (see Figs. 22 and 24). Downward motion of operating rod 632 upon actuation by cam element 601 is transmitted to arm 631 for shifting the work support in work supporting direction by a spring 649 disposed on operating rod 632 between the bushing block 645 and a clamp mechanism 650.

The clamp mechanism 650 comprises a front clamp bar 651 and a rear clamp bar 652 which are pivotably joined by a connecting link 653, each of the clamp bars 651 and 652 being recessed about midway of their length to fit the operating rod 632 as shown in Fig. 23. The rear clamp bar 652 is formed with a threaded bore 654 to receive a screw 655 extended through the front clamp bar 651, and the head 656 of which bears on a washer 657 to draw the clamp bars 651 and 652 together in clamping engagement with operating rod 632. The head 656 of screw 655 is formed with a handle bar 658 so that sufficient purchase may be obtained on screw 655 to secure effective clamping engagement with operating rod 632, and a guide key 659 is fitted over screw 655 between clamp bars 651 and 652 to ride in a slot 660 in operating rod 632 to prevent clamp mechanism 650 from turning on operating rod 632. Clamp mechanism 650 may thus be readily manipulated for adjusting the association of operating rod 632 with arm 631 in correspondence with any desired vertical adjustment of the work supporting mechanism 600.

As noted above, the fastener forming and inserting machine of the present invention is particularly adapted for woodworking operations. And it should be noted that the arrangement of the various operating elements, as described above is well suited to sturdy construction for heavy duty operations of this sort. Also, the work supporting mechanism used allows easy accommodation of a wide variety of work by the machine, and the fastener forming and inserting mechanism adapts the machine for operation in a singularly rapid and efficient manner.

We claim:

1. In a fastener forming and inserting machine adapted for forming a plurality of fasteners from a continuous length of wire, the combination with an operating mechanism incorporating means for cyclic actuation of fastener forming and fastener inserting operations, of a fastener inserting plunger member, a crank mechanism rotated in accordance with the cyclic actuation of said fastener forming and fastener inserting operations and arranged to reciprocate said plunger member, and means for adjusting the throw of said crank mechanism to regulate the driving depth of said plunger member.

2. In a fastener forming and inserting machine adapted for forming a plurality of fasteners from a continuous length of wire and inserting said fasteners in material to be secured, a fastener inserting plunger member mounted on said machine for reciprocation, a crank mechanism arranged on said machine to reciprocate said plunger member for fastener inserting operations, and means for adjusting the throw of said crank mechanism to regulate the driving depth of said plunger member.

3. A fastener forming and inserting machine adapted for forming a plurality of fasteners from a continuous length of wire and inserting said fasteners in material to be secured, comprising means for feeding wire for fastener forming operations, a fastener forming knife assembly adapted to receive said wire in fastener forming position and transfer fasteners formed to fastener inserting position, a fastener inserting plunger member, means associated with said plunger member for operation of said knife assembly between fastener forming and fastener inserting positions, a work supporting mechanism adapted to position work for fastener inserting operations, and an operating mechanism for cyclic actuation of fastener forming and inserting operations including a shaft member carrying a cam element for intermittent operation of said feeding means, a crank mechanism for reciprocating said plunger member to actuate said knife assembly and insert the fasteners formed, and a second cam element for actuating said work supporting mechanism to shift work in work supporting direction during fastener inserting operations.

4. A fastener forming and inserting machine as defined in claim 3 and further characterized in that said means for feeding wire comprises a second plunger member mounted for reciprocation on said machine to effect intermittent feeding action, a lever element associated with said second plunger member and disposed on said machine for displacement by said first mentioned cam element to effect a feeding stroke of said second plunger member, and means for adjusting the disposition of said lever element in relation to said first mentioned cam element and thereby vary the feeding stroke of said second plunger member.

JOHN G. WRIGHT.
CHARLES D. TONEY.
CHARLES A. WATKINS.
EUGENE SUDAN.
WILLIAM A. MAXWELL.

No references cited.